United States Patent
Nover et al.

(10) Patent No.: US 7,709,090 B2
(45) Date of Patent: May 4, 2010

(54) SURFACE-TREATED CALCIUM CARBONATE PARTICLES

(75) Inventors: Christoph Nover, Rheinberg (DE); Kurt Schinninger, Hallein (AT)

(73) Assignee: Solvay (Societe Anonyme), Brussels (BE)

( * ) Notice: Subject to any disclaimer, the term of this patent is extended or adjusted under 35 U.S.C. 154(b) by 748 days.

(21) Appl. No.: 10/586,684

(22) PCT Filed: Jan. 20, 2005

(86) PCT No.: PCT/EP2005/050232

§ 371 (c)(1),
(2), (4) Date: Jan. 10, 2007

(87) PCT Pub. No.: WO2005/071003

PCT Pub. Date: Aug. 4, 2005

(65) Prior Publication Data

US 2007/0258877 A1    Nov. 8, 2007

(30) Foreign Application Priority Data

Jan. 23, 2004    (EP) .................................. 04100254

(51) Int. Cl.
*C01F 11/18* (2006.01)
(52) U.S. Cl. ........................ 428/403; 423/274; 423/430

(58) Field of Classification Search ................. 423/430, 423/274; 428/403
See application file for complete search history.

(56) References Cited

U.S. PATENT DOCUMENTS

| 4,386,169 A * | 5/1983 | Artur et al. ................. 523/200 |
| 6,342,100 B1 | 1/2002 | Nover et al. |
| 6,498,211 B2 * | 12/2002 | Kobayashi et al. .......... 524/588 |

FOREIGN PATENT DOCUMENTS

| DE | 958 839 | 2/1957 |
| DE | 1 292 374 | 4/1969 |
| DE | 24 11 219 | 9/1974 |
| EP | 1 279 433 | 1/2003 |
| GB | 1 328 361 | 8/1973 |
| WO | 02 055596 | 7/2002 |
| WO | 03 004414 | 1/2003 |

* cited by examiner

*Primary Examiner*—Stuart Hendrickson
(74) *Attorney, Agent, or Firm*—Oblon, Spivak, McClelland, Maier & Neustadt, L.L.P.

(57) ABSTRACT

The particles comprise a core of calcium carbonate and a coating covering at least part of the surface of the core, the coating being carried out in at least two distinct consecutive steps, each step using a different coating agent. The coating agent used in the first step is preferably a fatty acid and the coating agent used in the second step is preferably a diol or a triol. The particles can be used as a functional filler, i.e. in plastisols formulations.

11 Claims, No Drawings

SURFACE-TREATED CALCIUM CARBONATE PARTICLES

This application is a 371 of PCT/EP05/50232, filed Jan. 20, 2005.

The invention relates to surface-treated calcium carbonate particles, a process for obtaining such particles and their use as a functional filler.

A typical application is their use as a filler in, for example, plastisols, underbody sealing materials for automobiles, sealing compounds, adhesives, polymers, rubber and printing inks. Here, the, surface-treated calcium carbonate particles are capable of controlling the flow behaviour of the materials and the mechanical properties of the cured materials. Thus, materials having very different flow behaviour can be produced by using suitable surface-treated calcium carbonate particles.

The Bingham yield value in a plasticizer mixture (SEB) is usually stated as a typical characteristic of the performance characteristics of calcium carbonate particles as filler. Depending on the intended use, very high, medium or low yield values may be desired. The ability of the surface-treated calcium carbonate particles to control the yield values is influenced, inter alia, by the surface treatment. Furthermore, the surface-treated calcium carbonate particles are distinguished by excellent dispersibility. The very fine crystals of the calcium carbonate generally tend to agglomerate. On incorporation of these surface-treated calcium carbonate particles, these agglomerates must as far as possible be broken up, which is substantially simplified by a surface treatment.

Even when finely milled, natural calcium carbonates occurring as calcites or aragonites for instance are unsatisfactory in their range of applications, owing to their small surface area.

Synthetically produced calcium carbonate substantially better meets the requirements for its use as a functional filler or additive.

Usually, synthetic calcium carbonate is prepared by reacting calcium hydroxide with carbon dioxide.

It is known that the processing properties of precipitated calcium carbonate can be influenced by coating with fatty acids, waxes, inorganic salts, etc.

Thus, for example, the shelf-life of sealing compounds can be improved or the wettability of the calcium carbonates having an organic matrix, as required for incorporation of the fillers into materials, or the yield value or the dispersibility can be influenced by the coating.

It is also known that calcium carbonate, in particular chalk, can be milled in the presence of surface-active substances, such as, for example, synthetic or natural fatty acids, fatty alcohols or waxes, in order to avoid caking (agglomeration) of the fine calcium carbonate particles (DE 958 839).

EP 1 279 433 discloses a process for improving the properties of particulate materials, e.g. sodium percarbonate, by multiple coating with coating agents known per se. Here, the coating agent on the particles forms a coating matrix, complete covering of the particles with the coating agent taking place.

The object of the invention is to provide calcium carbonate particles having improved properties, in particular having improved flow properties and improved dispersibility, and a process for its preparation. The object is achieved by the invention stated in the claims.

The particles according to the invention comprise a core of calcium carbonate and a coating covering at least part of the surface of the core, the coating being carried out in at least two distinct consecutive steps, each step using a different coating agent.

The calcium carbonate according to the invention may be a natural or a synthetic calcium carbonate. Natural calcium carbonate may be natural calcite or aragonite, occurring for instance as chalk or marble. It may be previously ground dry or in a suspension. Synthetic calcium carbonate is preferred.

Synthetic calcium carbonate can be obtained by any means. Among these means, consideration may be given to the precipitation of calcium carbonate by carbon dioxide starting with milk of lime (carbonation method) or precipitation by adding an alkali metal carbonate starting with lime water (caustification method) or precipitation by the addition of an alkali metal carbonate stating with solutions containing calcium chloride.

According to a preferred method within the context of the invention, calcium carbonate is precipitated by the carbonation of milk of lime.

According to a more preferred method within the context of the invention, calcium carbonate is precipitated by carbonation of milk of lime with a gas containing carbon dioxide. In this preferred means, milk of lime is generally obtained by slaking quick lime with water and the gas containing carbon dioxide is advantageously a rich gas, particularly a lime kiln gas.

The calcium carbonate precipitated in this way can optionally be isolated from the preparation medium by any known technique, such as filtration, atomization and centrifuging. Techniques by filtration and centrifuging are preferred.

The calcium carbonate can be substantially amorphous or substantially crystalline. Substantially amorphous or crystalline is understood to mean that more than 50% by weight of the calcium carbonate is in the form of amorphous or crystalline material when analysed by an X-ray diffraction technique. Substantially crystalline calcium carbonate is preferred. It can consist of calcite or aragonite or a mixture of these two crystalline phases. The calcite phase is preferred.

The particles of the calcium carbonate according to the invention can be of any size. The particle size is defined as the mean diameter of the particle as measured by the Lea and Nurse method (NF 11601/11602 standard). The mean diameter is usually lower than or equal to 1 µm, preferably lower than or equal to 0.1 µm and most preferably lower than or equal to 0.05 µm. That diameter is generally greater than or equal to 0.001 µm, advantageously greater than or equal to 0.010 µm and most advantageously greater than or equal to 0.015 µm.

According to the invention, the specific surface area of the calcium carbonate according to the invention is usually greater than or equal to 2 $m^2/g$, preferably greater than or equal to 10 $m^2/g$ and more preferably greater than or equal to 50 $m^2/g$. A specific surface area greater than or equal to 70 $m^2/g$ is particularly recommended. The specific surface area of particles of the calcium carbonate is generally less than or equal to 300 $m^2/g$, advantageously lower than or equal to 150 $m^2/g$. Values of the specific surface area less than or equal to 100 $m^2/g$ are being particularly preferred. The specific surface area is measured by the standard BET method (ISO 9277 standard).

The particles of the calcium carbonate according to the invention can exhibit various morphologies. They can have the form of needles, scalenohedra, rhombohedra, spheres, platelets or prisms. A rhombohedric shape, that can be reduced to pseudo-cubes or pseudo-spheres, is preferred.

The particles of the calcium carbonate according to the invention can exhibit various nanoscale structures—nano-faggots, nano-rosaries and nano-accordions—obtained by means of the method described and claimed in patent application WO 03004414. The definitions of nano-faggots, nano-rosaries and nano-accordions are given in document WO 03004414, page 5, line 33 to page 7, line 9 and are incorporated here for reference.

The particles can also be associated as microspherical entities, possibly hollow, that can be obtained by atomization.

The first coating agent according to the invention can be selected from alkylsulfates, sulfonic acids, carboxylic acids, their salts and their esters, fatty alcohols, polyhydric alcohols or mixtures thereof.

In a first embodiment according to the invention, the first coating agent is selected from carboxylic acids, their salts and their esters.

The carboxylic acid may be aliphatic or aromatic. Aliphatic carboxylic acids are preferred.

The aliphatic carboxylic acid may be any linear or branched or cyclic, substituted or non substituted, saturated or unsaturated, carboxylic acid. The aliphatic carboxylic acid has usually a number of carbon atoms greater than or equal to 4, preferably greater than or equal to 8, more preferably greater than or equal to 10 and most preferably greater than or equal to 14. The aliphatic carboxylic acid has generally a number of carbon atoms lower than or equal to 32, advantageously lower than or equal to 28, more advantageously lower than or equal to 24 and most advantageously lower than or equal to 22.

In a first variant the aliphatic carboxylic acid is selected from the group of substituted, non substituted, saturated and unsaturated fatty acids or mixture thereof. More preferably it is selected from the group consisting of caproic acid, caprylic acid, capric acid, lauric acid, myristic acid, palmitic acid, stearic acid, iso-stearic acid, hydroxystearic acid, arachidic acid, behenic acid, lignoceric acid, cerotic acid, montanic acid, melissic acid, myristoleic acid, palmitoleic acid, petroselinic acid, petroselaidic acid, oleic acid, elaidic acid, linoleic acid, linolelaidic acid, linolenic acid, linolenelaidic acid, a-eleostaeric acid, b-eleostearic acid, gadoleic acid, arachidonic acid, erucic acid, brassidic acid and clupanodonic acid, mixtures thereof or salts derived therefrom. Mixes containing mainly palmitic, stearic and oleic acids are more preferred. Mixtures which consist of about 30-40 wt % stearic acid, of about 40-50 wt.-% palmitic acid and of about 13-19 wt-% oleic acid are particularly preferred. Stearic acid is the most preferred.

In a second variant, the carboxylic acid is a rosin acid. The rosin acid is preferably selected from the group consisting of levopimaric acid, neoabietic acid, palustric acid, abietic acid, dehydroabietic acid, mixtures thereof or salts derived therefrom.

In a third variant the first coating agent is a salt of an aliphatic carboxylic acid, this may be the calcium salt of the carboxylic acid. However, the first coating agent may also be present e.g. in form of the sodium, potassium or ammonium salt of the aliphatic carboxylic acid.

In a fourth variant the first coating agent is an ester of an aliphatic carboxylic acid, with the following chemical formula $R^1COOR^2$. $R^1$ and $R^2$ can be equal or different and denote any aliphatic or aromatic, linear or branched or cyclic, substituted or non substituted, saturated or unsaturated, hydrocarbon radical. The hydrocarbon radical has usually a number of carbon atoms greater than or equal to 6, preferably greater than or equal to 8, more preferably greater than or equal to 10 and most preferably greater than or equal to 14. The hydrocarbon radical has generally a number of carbon atoms lower than or equal to 32, advantageously lower than or equal to 28, more advantageously lower than or equal to 24 and most advantageously lower than or equal to 22.

In a second embodiment according to the invention, the first coating agent is a fatty alcohol. By fatty alcohol, one intends to denote any primary or secondary, linear or branched, substituted or non substituted, saturated or unsaturated monohydric alcohol, having usually a number of carbon atoms greater than or equal to 6, preferably greater than or equal to 8, yet preferably greater than or equal to 10 and most preferably greater than or equal to 12. That number of carbon atoms is generally lower than or equal to 22, preferably lower than or equal to 20 and most preferably lower than or equal to 18.

In a third embodiment according to the invention, the first coating agent is a polyhydric alcohol. By polyhydric alcohol, one intends to denote any aliphatic or aromatic, linear or branched or cyclic, substituted or non substituted, saturated or unsaturated organic molecule containing at least two single carbon-hydroxyl (C—OH) bonds. The number of C—OH bonds in the molecule is usually lower than or equal to 10, preferably lower than or equal to 8 and most preferably, lower than or equal to 6. The number of carbon atoms in the molecule is generally greater than or equal to 2 and preferably greater than or equal to 3. This number of carbon atoms is usually lower than or equal to 20, preferably lower than or equal to 16 and most preferably lower than or equal to 10. The molecule may also contain heteroatoms other than the oxygen atoms of the C—OH bonds like, oxygen, fluorine and nitrogen. Polyhydric alcohols containing no other heteroatoms than those arising from the carbon-hydroxyl groups are preferred. Diols and triols are more preferred. Diols and triols containing equal numbers of carbons atoms and of C—OH bonds are yet more preferred. 1,2-ethanediol and glycerol are still more preferred and glycerol is the most preferred. Glycerol can be natural or synthetic.

Stearic acid and its salts are the most preferred first coating agents.

The amount of the first coating agent on the coated calcium carbonate particles is generally greater than or equal to 0.1% by weight preferably greater than or equal to 0.5% by weight and more particularly greater than or equal to 1% by weight. This content is normally lower than or equal to 20% by weight and more specifically lower than or equal to 15% by weight. A content lower than or equal to 5% by weight is particularly suitable.

The second coating agent according to the invention can be selected from polyhydric alcohols, esters of carboxylic acids, or mixtures thereof.

The polyhydric alcohols are defined as above. Glycerol and 1,2-ethanediol are preferred and glycerol is the most preferred.

The esters of carboxylic acids can be esters of aliphatic or aromatic carboxylic acids. Esters of aromatic carboxylic acids are preferred and esters of phthalic acids are the most preferred. The phthalic acids may be any one of the ortho-, meta- and para-isomers or mixture thereof. Esters of phthalic acids are selected from mono- and di-alkylphthalates and mixture thereof. Dialkylphthalates are preferred. By "alkyl" one intends to denote hydrocarbons chains, linear or branched or cyclic, saturated or unsaturated, substituted or unsubstituted, comprising a number of carbon atoms usually greater than or equal to 1, preferably greater than or equal to 4, more preferably greater than or equal to 6 and most preferably greater than or equal to 8. That number of carbon atoms is generally lower than or equal to 24, advantageously lower than or equal to 20, more advantageously lower than or equal to 18 and most advantageously lower than or equal to 14. Di-n-octyl-isophthalate is the particularly most preferred ester.

The amount of the second coating agent on the coated calcium carbonate particles is generally greater than or equal to 0.5% by weight, preferably greater than or equal to 1% by weight and more particularly greater than or equal to 5% by weight. This content is normally lower than or equal to 20% by weight and more specifically lower than or equal to 15% by weight. A content lower than or equal to 10% by weight is particularly suitable.

Without being bound by any theory, it is believed that free areas on the $CaCO_3$ surface which remain after the first coating are covered by the second coating agent.

In the context of the invention, the first and the second coating agents may be of different materials as well as of the same materials. It is preferred that the first and second coating agents are different.

In a particularly preferred embodiment, the calcium carbonate particles are first coated with stearic acid or stearic acid salts and then a second coat, with glycerol as the second coating agent is applied to the already coated calcium carbonate particles.

The invention also relates to a process for preparing surface-treated calcium carbonate particles.

The process according to the invention for the surface treatment of calcium carbonate particles, in which a coating agent is applied to the calcium carbonate particles, envisages first bringing the calcium carbonate particles into contact with a first coating agent and then applying a second coating agent.

The calcium carbonate particles are brought into contact in a manner known per se with the first coating agent in liquid or solid form, for example during the milling process and/or after the precipitation, the coating agent being held on the surface of the calcium carbonate particles.

In a first embodiment, the treatment of the calcium carbonate particles with the first coating agent takes place in emulsified form in an aqueous system. For further details, it can be referred to e.g. U.S. Pat. No. 6,342,100 with is fully incorporated by reference herein.

In a second embodiment, the treatment of the calcium carbonate particles with the first coating agent takes place with the coating agent dissolved in an aqueous or in an organic system.

In a third embodiment, the treatment of the calcium carbonate particles with the first coating agent takes place with the pure coating agent in a solid, liquid or gas form.

It is preferred that the treatment of the calcium carbonate particles with the first coating agent takes place in emulsified form in an aqueous system.

The coated calcium carbonate particles are again brought into contact in a manner known per se with a second coating agent in liquid, dissolved, solid or gas form, as defined above, the second coating agent being held on the surface of the calcium carbonate.

It is preferred to use the second coating agent in dissolved form.

The invention also relates to the use of the surface-treated calcium carbonate particles as a functional filler.

It was found that the surface-treated calcium carbonate particles according to the invention have better dispersibility. They show less tendency to form agglomerates. Any agglomerates of the surface-treated calcium carbonate particles which are present disperse better on incorporation into materials.

As a result of the second coating, the yield value can be varied in a very broad range, it being possible thus to establish high values which would not have been achievable without the addition of a second coating. For certain intended uses of the coated calcium carbonate particles, coating only with polyhydric alcohol may itself be sufficient to achieve the properties desired by the end user. However the surface-treated calcium carbonate particles according to the invention exhibit broader ranges of yield values, viscosities and dispersibilities.

The yield value of $CaCO_3$ coated with fatty acid is controllable, for example, in the range from 30 Pa to 350 Pa. As a result of the additional coating with polyhydric alcohols or substituted polyhydric alcohols, an increase in the yield value can be achieved. The yield value is generally greater than or equal to 100 Pa, preferably greater than or equal to 200 Pa, more preferably greater than or equal to 600 Pa Values greater than or equal to 1000 Pa are the most preferred.

Furthermore, a correction of the yield value after the first coating is possible. If, after the first coating, the measured yield value does not correspond to the desired value, this desired value can be subsequently established by targeted additional coating.

The advantages for the user consist firstly in an increase in the constancy of the yield value. As a result of the second coating, it is possible to produce a very constant quality which enables the user to work with constant formulations. The subsequent adjustment of the rheological behaviour of the formulated materials is superfluous. Furthermore, the dispersing process is accelerated so that, on the one hand, the processing capacity of the user increases but, on the other hand, better surface smoothnesses of the materials are also achieved. Furthermore, with the use of surface-treated calcium carbonate particles having a very high yield value, the proportion of calcium carbonate in the sealing compound can be reduced, which has a positive effect on the density of the material. Particularly in the automotive sector, sealing compounds, underbody sealing materials and adhesives having a low density are preferred.

The following examples further illustrate the invention but are not to be construed as limiting its scope.

Rheological Properties

The rheological properties of plasticizer mixtures containing the calcium carbonate particles have been obtained according to the following procedure. The following formulation has been prepared by mixing 35 g of a plasticizer (e.g. di-octylphtalate, di-isononylphtalate, adipate, sebacate), 25 g of a polyvinyl chloride polymer (e.g. Vestolit Vinolit), 4 g of a solvent (e.g. derivatives of hydrocarbons), 16.2 g of Natural Calcium Carbonate, 0.5 g of fumed silica, 2.3 g of a desiccant (e.g. CaO), 1 g of a promoter (e.g. Polyamines, Polyamides) and 16 g of coated calcium carbonate particles, in an INOX-beaker (diameter 120 mm, height 85 mm) fitted with a dissolving disk stirrer (diameter 80 mm). The mixture has been homogenized by rotating the disk at 250 rpm for 1 minute and 800 rpm for 10 minutes. The bottom part of the resulting mixture has been used for the rheological measurements.

The rheological properties of the various formulations obtained from Example 2 were investigated according to the ISO 3219 norm. The measurements were performed in a rheometer type PHYSICA MC 120 Z 4 DIN. This rheometer measures the development of the shearing forces and the viscosity in function of the velocity gradient (shear rate) imposed. All measurements were performed at 25° C. according to the following procedure:

keeping the probe at 25° C. for 5 minutes until a thermal equilibrium has been reached accelerating from 0 to 100 s$^{-1}$ over 2 minutes measuring 120 data points
keeping 1 minute at 100 s$^{-1}$ measuring 20 data points
decelerating from 100 to 0 s$^{-1}$ over 2 minutes measuring 120 data points.

For the evaluation, only the descending branch of the rheogram is used, extrapolating the curve according to the law of Bingham (linear extrapolation). Linear extrapolation has been made using all the points between the 77 and 100 s$^{-1}$ values of the shear rate. The yield value has been obtained as the cross point of the extrapolation curve with the y-axis. The viscosity has been determined from the shear stress at 100 s$^{-1}$.

EXAMPLE 1

Preparation of Precipitated Calcium Carbonate (According to the Invention)

Milk of lime having a concentration of 150 g/l of calcium hydroxide was heated to 18° C. in a reactor. After this staring temperature had been reached, $CO_2$ containing gas was passed into the reactor, the $CO_2$ feed being kept constant.

| | |
|---|---|
| $CO_2$/air mixture | 30:70 |
| Gas feed | 1 m$^3$/h (based on 10 l of milk of lime) |
| Precipitation time | 100 min |

EXAMPLE 2

Preparation of the 1st Coating Agent (According to the Invention)

1 035 g of water were heated to 75° C. and 122 g of stearic acid were added. This mixture was heated for 15 min. 60 ml of 25 wt % ammonia solution were added with stirring, and the mixture was homogenized for 30 min. The pale homogeneous emulsion contained 10% by weight of stearic acid.

EXAMPLE 3

1st Coating Procedure (According to the Invention)

The coating agent prepared according to example 2 was introduced into 20 l of the calcium carbonate suspension prepared according to example 1, and the mixture was stirred for 1 hour at 75° C.
The coated calcium carbonate was separated off, dried and milled. The calcium carbonate coated in this manner contained 3% by weight of stearate coating.

EXAMPLE 4

2nd Coating Procedure (According to the Invention)

Glycerol was dissolved in water in a ratio of 1:3 and sprayed onto the precipitated calcium carbonate particles (uncoated and coated).
The samples were dried at 50° C. and then milled at 18 000 rpm in a pinned-disc mill.

EXAMPLE 5

Not According to the Invention

Precipitated calcium carbonate according to example 1 was coated with different amounts of glycerol, and the flow behaviour was determined.

| | Amount of glycerol | | | | |
|---|---|---|---|---|---|
| | 0% | 0.5% | 1% | 3% | 6% |
| Yield point (Pa) | 185 | 232 | 251 | 284 | 280 |
| Viscosity (Pa · s) | 4.5 | 4.6 | 4.6 | 5.5 | 4.6 |

EXAMPLE 6

According to the Invention

Precipitated calcium carbonate (example 1) was coated with 2 g of stearic acid per 100 g of calcium carbonate analogously to example 3. Different amounts of glycerol were applied as a second coat, and the flow behaviour was determined.

| | Amount of glycerol | | | | |
|---|---|---|---|---|---|
| | 0% | 0.5% | 1% | 3% | 6% |
| Yield value (Pa) | 57 | 102 | 124 | 186 | 256 |
| Viscosity (Pa · s) | 2.4 | 2.9 | 3.0 | 3.6 | 4.4 |

EXAMPLE 7

According to the Invention

Precipitated calcium carbonate (example 1) was coated with 3 g of stearic acid per 100 g of calcium carbonate analogously to example 3. Different amounts of glycerol were applied as a second coat, and the flow behaviour was determined.

| | Amount of glycerol | | | | |
|---|---|---|---|---|---|
| | 0% | 0.5% | 1% | 3% | 6% |
| Yield value (Pa) | 98 | 141 | 156 | 208 | 280 |
| Viscosity (Pa · s) | 2.7 | 3.4 | 3.5 | 3.8 | 4.6 |

EXAMPLE 8

The dispersibility of the $CaCO_3$ particles was determined by laser light scattering.

| Amount of glycerol | Mean agglomerate diameter (μm) | | |
|---|---|---|---|
| | Example 5 | Example 6 | Example 7 |
| 0% | 1.397 | 1.036 | 0.630 |
| 0.5% | 1.173 | 0.567 | 0.439 |
| 1% | 1.112 | 0.413 | 0.411 |
| 3% | 1.243 | 0.607 | 0.440 |
| 6% | 1.257 | 0.680 | 0.433 |

The results show that the yield value, viscosity and dispersibility can be controlled by the second coating according to the invention.

The invention claimed is:

1. Particles comprising a core of calcium carbonate and a coating covering at least part of the surface of the core, said coating comprising at least two different coating agents which are applied in at least two distinct and consecutive steps,
wherein a first coating agent comprises at least one compound selected from the group consisting of alkylsulfates, sulfonic acids, carboxylic acids, their salts, their esters, fatty alcohols, polyhydric alcohols and mixtures thereof and is applied on at least part of the surface of the core in a first step to provide an intermediate product, and wherein a second coating agent comprises at least one compound selected from the group consisting of polyhydric alcohols, esters of carboxylic acids, and mixtures thereof and is applied on at least part of the surface of said intermediate product in a second step.

2. A process for the preparation of particles according to claim 1, in which core particles of calcium carbonate are first brought into contact with said first coating agent to provide coated particles and then said second coating agent is applied to the coated particles.

3. The process according to claim 2 wherein the second coating agent is applied in liquid, dissolved, solid or gas form.

4. A method of using the particles according to claim 1 as a filler, comprising adding said particles to a product selected from the group consisting of rubbers, inks, plastisols, sealants, papers, paints, coatings, pharmaceuticals, foods and cosmetics.

5. The method according to claim 4 wherein the filler is incorporated in a product selected from the group consisting of rubbers, inks, plastisols, sealants, papers, paints, and coatings.

6. The particles of claim 1, wherein said first coating agent comprises a fatty acid and said second coating agent comprises at least one of a diol and a triol.

7. The particles of claim 1, wherein said first coating agent comprises stearic acid and said second coating agent comprises at least one of 1,2-ethanediol and glycerol.

8. The particles of claim 1, wherein said first coating agent comprises a fatty acid and said second coating agent comprises a phthalic acid ester.

9. The particles of claim 1, wherein said first coating agent comprises stearic acid and said second coating agent comprises glycerol.

10. The particles of claim 1, wherein the amount of the first coating agent is 1-5% by weight, and the amount of the second coating agent is 5-10% by weight.

11. The particles of claim 9, wherein the amount of the first coating agent is 1-5% by weight, and the amount of the second coating agent is 5-10% by weight.

* * * * *